(12) United States Patent
Drda et al.

(10) Patent No.: US 10,622,883 B2
(45) Date of Patent: Apr. 14, 2020

(54) METHOD AND SYSTEM OF A RESONANT POWER CONVERTER

(71) Applicant: SEMICONDUCTOR COMPONENTS INDUSTRIES, LLC, Phoenix, AZ (US)

(72) Inventors: Vaclav Drda, Valasska Bystrice (CZ); Roman Stuler, Karolinka (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/010,578

(22) Filed: Jun. 18, 2018

(65) Prior Publication Data

US 2019/0386558 A1    Dec. 19, 2019

(51) Int. Cl.
*H02M 1/32*    (2007.01)
*H02M 3/335*   (2006.01)
(Continued)

(52) U.S. Cl.
CPC .............. *H02M 1/32* (2013.01); *H02M 1/08* (2013.01); *H02M 3/33569* (2013.01); *H02M 2001/0009* (2013.01); *H02M 2001/0025* (2013.01)

(58) Field of Classification Search
CPC ............ H02M 1/32; H02M 1/08; H02M 1/36; H02M 3/33507; H02M 3/33523;
(Continued)

(56) References Cited

U.S. PATENT DOCUMENTS

| | | | |
|---|---|---|---|
| 6,631,064 B2* | 10/2003 | Schuellein | H02H 7/1213 361/93.1 |
| 7,843,248 B1* | 11/2010 | Webb | H03K 17/165 327/419 |

(Continued)

OTHER PUBLICATIONS

"An introduction to LLC resonant half-bridge converter," ST AN2644 Application Note, Sep. 2008, Copyright 2008 STMicroelectronics, 64 pages.

(Continued)

*Primary Examiner* — Gustavo A Rosario-Benitez
(74) *Attorney, Agent, or Firm* — Dickinson Wright PLLC; Mark E. Scott

(57) ABSTRACT

Resonant power converters. Example embodiments are integrated circuit controllers for a resonant power converter, the controllers including: a frequency controller configured to control frequency of signals driven to a high-side gate terminal and a low-side gate terminal; a fault detector configured to sense an overcurrent condition of a primary winding of the resonant power converter, and to assert an overcurrent signal responsive to the overcurrent condition; a feedback controller that, during periods of time when the overcurrent signal is de-asserted, is configured to sense a signal representative of output voltage by way of the feedback terminal and to create an intermediate signal; and the feedback controller further configured to, during periods when the overcurrent signal is asserted, modify the intermediate signal to increase the frequency of the signals driven to the high-side gate terminal and the low-side gate terminal.

19 Claims, 6 Drawing Sheets

(51) Int. Cl.
*H02M 1/08* (2006.01)
*H02M 1/00* (2006.01)

(58) Field of Classification Search
CPC .......... H02M 3/33569; H02M 1/4241; H02M 2001/0058; H02M 2001/0022; H02M 2001/0009; H02M 2001/0025; H02M 3/335; H02M 2007/4815; H02M 2007/4811; Y02B 70/1491; Y02B 70/1433

See application file for complete search history.

(56) References Cited

U.S. PATENT DOCUMENTS

| | | | | |
|---|---|---|---|---|
| 8,085,558 B2* | 12/2011 | Choi | ................... | H02M 3/337 |
| | | | | 363/21.02 |
| 8,085,559 B1* | 12/2011 | Choi | ................... | H02M 3/3376 |
| | | | | 363/21.02 |
| 9,520,795 B2 | 12/2016 | Stuler et al. | | |
| 2007/0097578 A1* | 5/2007 | Bartolo | ................... | H02M 1/32 |
| | | | | 361/93.1 |
| 2013/0343096 A1* | 12/2013 | Stuler | ................... | H02M 1/32 |
| | | | | 363/21.02 |
| 2015/0028823 A1* | 1/2015 | Li | ................... | G05F 1/66 |
| | | | | 323/234 |
| 2015/0194896 A1* | 7/2015 | Stuler | ................... | H02M 3/33523 |
| | | | | 363/21.02 |
| 2017/0201181 A1* | 7/2017 | Yabuzaki | ................... | H02M 1/12 |
| 2018/0138693 A1* | 5/2018 | Matsuda | ................... | H02M 1/32 |
| 2019/0157860 A1* | 5/2019 | Duvnjak | ................... | H02M 1/08 |

OTHER PUBLICATIONS

"High Performance Current Mode Resonant Controller with Integrated High-Voltage Drivers," NCP1399 Series, NCP1399/D. Sep. 2017, Copyright Semiconductor Components Industries, LLC 2016, 46 pages.

* cited by examiner

METHOD AND SYSTEM OF A RESONANT POWER CONVERTER

CROSS-REFERENCE TO RELATED APPLICATIONS

Not Applicable.

BACKGROUND

Resonant power converters utilize a resonant circuit on the primary side of the power converter to create an alternating current (AC) signal applied to a primary winding of a transformer. Electrically-controlled switches on the primary side of the resonant power converter are used to create the AC signal and are controlled by a primary-side controller. The AC signal applied to the primary winding is transferred across the transformer to create an AC signal on the secondary winding. In some cases, the AC signal on the secondary winding is then rectified (e.g., full-wave rectification, half-wave rectification) to supply a direct current (DC) voltage to a load.

Related-art primary-side controllers implement overcurrent protection. That is, when a sustained overload or short circuit occurs on the secondary side (e.g., at the load), the primary-side controller shuts down operation of the resonant power converter to protect the components of the resonant power converter. However, sensing an overload or short circuit condition, and shutting down the resonant power converter, takes a finite number cycles of the AC signal. Thus, substantial overcurrent conditions can occur in both the primary and secondary circuits of the resonant power converter between when the overload or short circuit occurs, and when the primary-side controller senses the condition and shuts down the power converter. Resonant power converter designers thus over-design components of power converters to take into account possible overcurrent conditions, which over-design increases cost, size, and weight of the resonant power converters.

BRIEF DESCRIPTION OF THE DRAWINGS

For a detailed description of example embodiments, reference will now be made to the accompanying drawings in which.

DEFINITIONS

Figure 1:
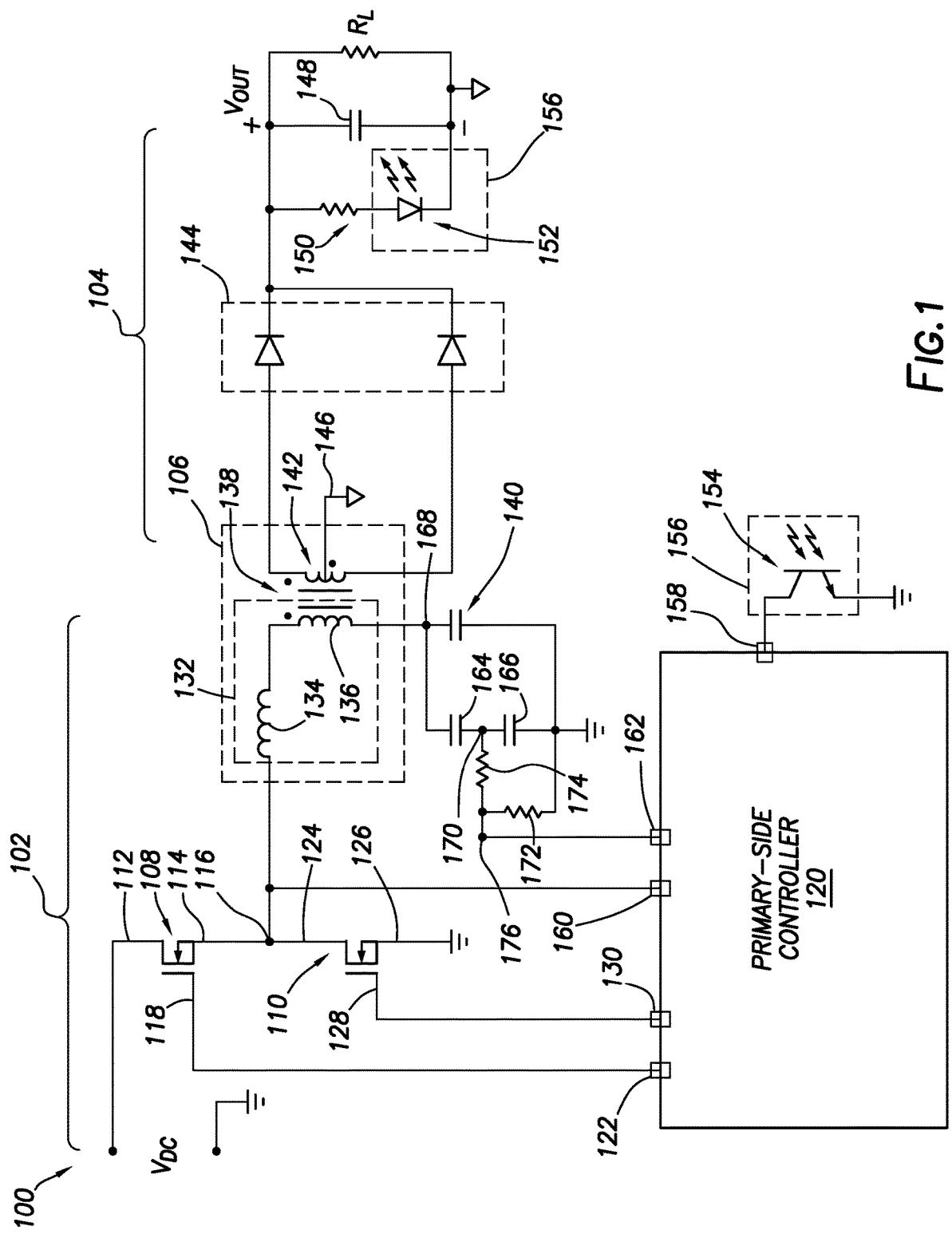
FIG. 1 shows a resonant power converter in accordance with at least some embodiments.

Various terms are used to refer to particular system components. Different companies may refer to a component by different names this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

In relation to electrical devices (whether stand alone or as part of an integrated circuit), the terms "input" and "output" refer to electrical connections to the electrical devices, and shall not be read as verbs requiring action. For example, a differential amplifier (such as an operational amplifier) may have a first differential input and a second differential input, and these "inputs" define electrical connections to the operational amplifier, and shall not be read to require inputting signals to the operational amplifier.

"Controller" shall mean individual circuit components on a substrate, an application specific integrated circuit (ASIC) constructed on a substrate, a microcontroller constructed on a substrate (with controlling software stored on or off the substrate), or combinations thereof configured to read signals and take action responsive to such signals.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Example embodiments are directed to resonant power converters. More specifically, various example embodiments are directed to resonant power converters with primary-side controllers that limit input current and output current during overload and short circuit conditions. The current limitation is in addition to overcurrent protection that shuts down the resonant power converter in severe overcurrent conditions. Because the current is limited during overload and short circuit conditions prior to shut down, various circuit components (e.g., inductors, transformers, bridge rectifiers) can be designed for nominal power conditions rather than for overcurrent conditions. More specifically still, the primary-side controller in accordance various embodiments senses current in the primary winding of the transformer, and when overcurrent conditions are sensed the primary-side controller limits current by increasing frequency of an alternating current (AC) signal applied to the primary winding. The specification now describes a resonant power converter to orient the reader.

FIG. 1 shows a resonant power converter in accordance with at least some embodiments. In particular, the resonant power converter 100 of FIG. 1 comprises a primary side 102 and a secondary side 104 coupled by a transformer 106. Working from left to right in FIG. 1, the resonant power converter 100 comprises a high-side field effect transistor (FET) 108 and a low-side FET 110. The high-side FET 108 has a drain 112 coupled to the input direct current (DC) voltage (hereafter input voltage $V_{DC}$), and a source 114 coupled to a switch node 116. The gate 118 of the high-side FET 108 couples to a primary-side controller 120 by way of a high-side gate terminal 122. When commanded by the primary-side controller 120 by assertion of the gate 118, the high-side FET 108 couples the switch node 116 (and thus transformer 106) to the input voltage $V_{DC}$. The low-side FET 110 has a drain 124 coupled to the switch node 116, and a source 126 coupled to ground on the primary side. The gate 128 of the low-side FET 110 couples to the primary-side controller 120 by way of a low-side gate terminal 130. When commanded by the primary-side controller 120 by assertion of the gate 128, the low-side FET 110 couples the switch node 116 to ground on the primary side. In operation, the primary-side controller 120 alternately couples the switch node 116 to the input voltage $V_{DC}$ and then to ground by way of the high-side FET 108 and low-side FET 110, respectively, creating an alternating current (AC) signal at the switch node 116 (and thus applying the AC signal to the transformer 106). In order not to short the input voltage $V_{DC}$ to ground, the primary-side controller 120 is designed and constructed such that the high-side FET 108 and low-side FET 110 are not simultaneously commanded to conduct (i.e., there is a dead zone or dead band of time between assertion of the respective gates).

The switch node 116 is coupled to the primary winding 132 of the transformer 106. The primary winding 132 in FIG. 1 is shown as separated inductances, with leakage inductance of the primary winding 132 represented by leakage inductance 134, and primary inductance of the primary winding 132 represented by primary inductance 136 (the primary inductance associated with the metallic core 138). In series with the primary winding 132 is capacitor 140. That is, capacitor 140 is coupled between a second terminal or connection of the primary winding 132 and ground on the primary side 102. The leakage inductance 134, primary inductance 136, and capacitor 140 thus create an inductor-inductor-capacitor (LLC) tank or resonant circuit on the primary side 102. The AC signal driven to the switch node 116 has a frequency that may be at or near the resonant frequency of the LLC resonant circuit. With respect operating an LLC resonant power converter, attention is directed to commonly owned U.S. Pat. No. 9,520,795, incorporated by reference herein as if reproduced in full below.

Still referring to FIG. 1, the transformer 106 further comprises a secondary winding 142 coupled to a bridge rectifier 144. In the example secondary side 104 shown in FIG. 1, the secondary winding 142 has a center tap 146 coupled to common on the secondary side 104. The other terminals of the secondary winding 142 couple to an example bridge rectifier 144 having two diodes. In other cases, the center tap 146 may be electrically floated, and the two remaining terminals coupled to another example bridge rectifier having four diodes. The bridge rectifier 144 is coupled to a smoothing capacitor 148 which filters the rectified signal produced by the bridge rectifier 144 to create the output voltage $V_{OUT}$. In the example system, a load is illustratively shown as a resistor $R_L$ coupled across the output voltage $V_{OUT}$.

Still referring to the secondary side 104, a reference resistor 150 is coupled to a positive terminal of $V_{OUT}$, and the reference resistor 150 then couples to an anode of a diode 152. The cathode of diode 152 couples to common on the secondary side 104. The diode 152 is part of an optocoupler 156 that that senses output voltage $V_{OUT}$, and optically transfers an indication of the output voltage to the base of transistor 154, the transistor 154 also part of the optocoupler 156. The transistor 154 of the optocoupler 156 illustratively has its collector coupled to a feedback terminal 158 of the primary-side controller 120, and its emitter coupled to ground on the primary side 102. Thus, the primary-side controller 120 senses a signal representative of output voltage provided to the load by way of the optocoupler 156 and feedback terminal 158.

In operation, the high-side FET 108 and low-side FET 110 alternately couple the switch node 116 to the input voltage $V_{DC}$ and ground, thus creating the AC signal applied to the primary winding 132. The AC signal applied to the primary winding 132 is transferred across the transformer 106 to create an AC signal on the secondary winding 142 (with the voltage relationship between the AC signal on the primary winding and the AC signal on the secondary winding dictated by the turns ratio of the transformer). The AC signal created on the secondary winding 142 is then rectified by the bridge rectifier 144 and smoothed to create the output voltage $V_{OUT}$ applied to the load $R_L$.

The primary-side controller 120 controls the frequency of the AC signal at switch node 116 (i.e., controls the frequency of the assertion of the gate signals to the high-side FET 108 and low-side FET 110). In accordance with example embodiments, the frequency of the gate signals applied to the high-side FET 108 and low-side FET 110, and thus the fundamental frequency of the AC signal at the switch node 116, is managed or controlled based on several signals. One example signal is the signal representative of output voltage sensed at the feedback terminal 158. Another example signal is a signal representative of the AC signal at switch node 116 sensed at a switch-node terminal 160. That is, the switch-node terminal 160 of the primary-side controller 120 is coupled to the switch node 116. Yet another example signal is a signal representative of current in the primary winding 132 sensed at current-sense terminal 162. In particular, the current sense terminal 162 couples to an AC voltage divider circuit illustratively shown as capacitors 164 and 166. The capacitors 164 and 166 are coupled in series, and the two series capacitors 164/166 are coupled in parallel to capacitor 140. Thus, AC signals at the node 168 between the primary winding 132 and the capacitor 140 are divided by the capacitors 164 and 166. In some cases, the current-sense terminal 162 may couple directly to the node 170 between capacitors 164 and 166. In yet still other cases, a further voltage divider circuit (illustratively shown as two resistors 172 and 174) is implemented. Thus, in the example system the current-sense terminal 162 is coupled to the node 176 between the resistors 172 and 174.

Still considering frequency of the AC signal created and applied to the switch node 116, primarily the frequency of the AC signal is based on the power provided to the load, with lower frequency for higher loads and higher frequency for lower loads (though the frequencies still within a controlled range close to or around the resonant frequency of the LLC circuit on the primary side 102). Adjustments to frequency made by the primary-side controller 120 may be based on the signal representative of output voltage sensed on the feedback terminal 158, with lower output voltage $V_{OUT}$ indicating increased load (resulting in lower frequency), and higher output voltage $V_{OUT}$ indicating decreased load (resulting in higher frequency). Second, the primary-side controller 120 may also adjust frequency to reduce harmonics created on the primary side 102 by the frequency of the AC signal at switch node 116 as sensed at switch-node terminal 160 (possibly in combination with changes in duty cycle). In non-fault conditions (i.e., no overload or short circuit condition on the secondary side 104), and notwithstanding frequency changes to reduce harmonics, the primary-side controller 120 decreases frequency of the AC signal at the switch node 116 with increasing power provided to the load, and likewise the primary-side controller 120 increases frequency of the AC signal at the switch node 116 with decreasing power provided to the load. The specification now turns to an example primary-side controller 120.

Figure 2:
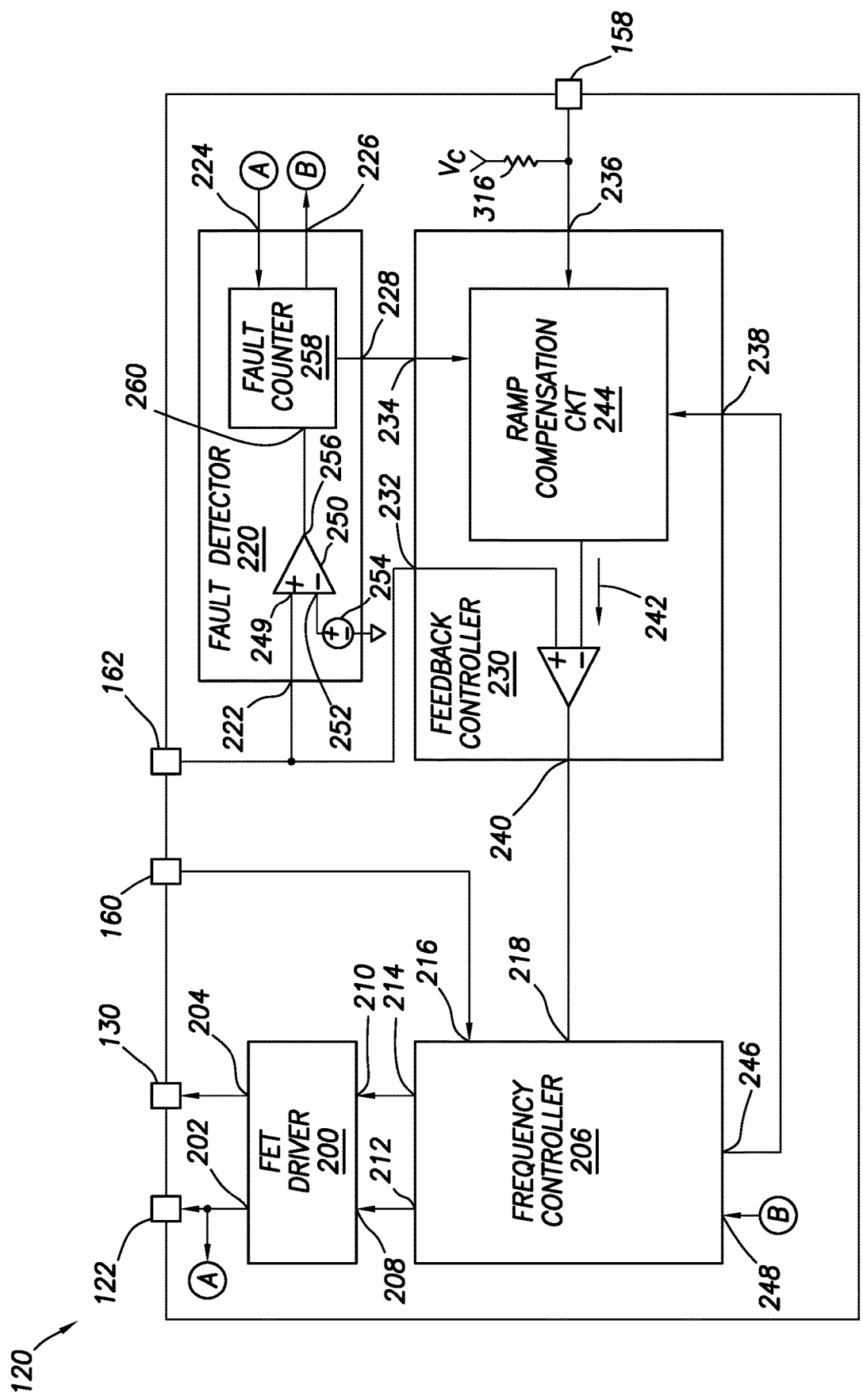
FIG. 2 shows a block diagram of a primary-side controller in accordance with at least some embodiments.

FIG. 2 shows a block diagram of a primary-side controller in accordance with at least some embodiments. In particular, FIG. 2 shows a block diagram of a primary-side controller 120 for a resonant power converter, where the primary-side controller 120 may be a monolithically constructed integrated circuit. The example primary-side controller 120 comprises the high-side gate terminal 122, the low-side gate terminal 130, the switch-node terminal 160, the current-sense terminal 162, and the feedback terminal 158, all at the same relative locations as shown in FIG. 1; however, the physical placement of terminals of a primary-side controller is arbitrary, and thus the location of the example terminals is not limiting. Moreover, additional terminals that would be present (e.g., power terminal, ground terminal) are omitted so as not to unduly complicate the figure.

The example primary-side controller 120 comprises a FET driver 200. The FET driver 200 is designed and constructed to drive the gates of the high-side FET and low-side FET with appropriate signals. Thus, the FET driver 200 comprises a high-side output 202 coupled to the high-side gate terminal 122, and a low-side output 204 coupled to the low-side gate terminal 130. The FET driver 200 drives the respective gate terminals responsive to signals provided from the frequency controller 206. In the example system, the FET driver 200 thus comprises a high-side input 208 and a low side input 210, each coupled to the frequency controller 206. In most operational circumstances, the assertions of the gate signals to the gates of the FETS are mutually exclusive, and thus a single signal from the frequency controller could suffice to provide the needed information from the frequency controller 206, but having two inputs provided also enables the frequency controller 206 to provide additional commands and information, such as a command to cease operational (e.g., when both the high-side input and low-side input are de-asserted).

Still referring to FIG. 2, the example primary-side controller 120 comprises the frequency controller 206 mentioned above. The frequency controller 206 defines a high-side output 212 and a low-side output 214 coupled to the high-side input 208 and low-side input 210 of the FET driver 200, respectively. The frequency controller 206 further defines a sense input 216 coupled to the switch-node terminal 160. The example frequency controller 206 senses the AC signal at the switch node 116 (FIG. 1) by way of the switch-node terminal 160 and sense input 216. The example frequency controller 206 further defines a timing input 218. By way of the timing input 218 the frequency controller 206 is provided information that determines the timing of de-assertion of the high-side gate terminal 122 and, by extension, timing of assertion of the low-side gate terminal130 (discussed more below).

The example primary side controller further comprises a fault detector 220. The fault detector 220 has a sense input 222 coupled to the current-sense terminal 162. The example fault detector has a pulse-count input 224 illustratively coupled to the high-side output 202 of the FET driver 200 (and thus the high-side gate terminal 122). The example fault detector also has a fault output 226 coupled to the frequency controller 206. The example fault detector further includes an overcurrent output 228 upon which the fault detector drives signals (e.g., Boolean, analog) indicative of overcurrent conditions as detected by the fault detector 220. In accordance at least some embodiments, the fault detector 220 is designed and constructed to sense an overcurrent condition of a primary winding of the resonant power converter (by way of the sense input 222 and current-sense terminal 162). The example fault detector 220 is further designed and constructed to assert an overcurrent signal on the overcurrent output 228 responsive to the overcurrent condition. Example operational modes of the fault detector 220 are discussed more below after introduction of further components of the primary-side controller 120.

Still referring to FIG. 2, the example primary-side controller 120 further comprises a feedback controller 230. The feedback controller 230 defines sense input 232 coupled to the current-sense terminal 162. The example feedback controller 230 defines an overcurrent input 234 coupled to the overcurrent output 228 of the fault detector 220. The feedback controller 230 defines a feedback input 236 coupled to the feedback terminal 158. The feedback controller 230 defines a ramp input 238 coupled to the frequency controller 206. And finally, the feedback controller 230 defines a timing output 240 coupled to the timing input 218 of the frequency controller 206. In accordance with example embodiments, the during periods of time when the overcurrent signal on the overcurrent input 234 (from the fault detector 220) is de-asserted, the feedback controller 230 is designed and constructed to sense a signal representative of output voltage by way of the feedback input 236 and feedback terminal 158 and to create an intermediate signal 242 (that ultimately is used to create a timing signal on the timing output 240, as discussed more below). Moreover, during periods when the overcurrent signal on the overcurrent input 234 (from the fault detector 220) is asserted, the feedback controller 230 is designed and constructed to modify the intermediate signal 242 to increase the frequency of the signals driven to the high-side gate terminal 122 and the low-side gate terminal 130. In example systems, the creation of the intermediate signal 242, and modification thereof during certain operational states, is performed by a ramp compensation circuit 244. An example implementation of the ramp compensation circuit 244 is discussed more below.

Returning briefly to the frequency controller 206. The example frequency controller 206 thus further defines a ramp output 246 coupled to the ramp input 238 of the feedback controller 230. As will be discussed more below, a ramp signal driven to the ramp output 246 controls operational aspects of the ramp compensation circuit 244. Moreover, the frequency controller 206 defines a fault input 248 coupled to the fault output 226 of the fault detector 220. Responsive to detection of an overcurrent condition by the fault detector 220 and assertion of the fault output 226, the frequency controller 206 ceases operation of the resonant power converter. An example fault condition that may result in ceasing operation is discussed more below. The specification now turns to a description of operation of the resonant power converter and example primary-side controller 120.

Figure 3:
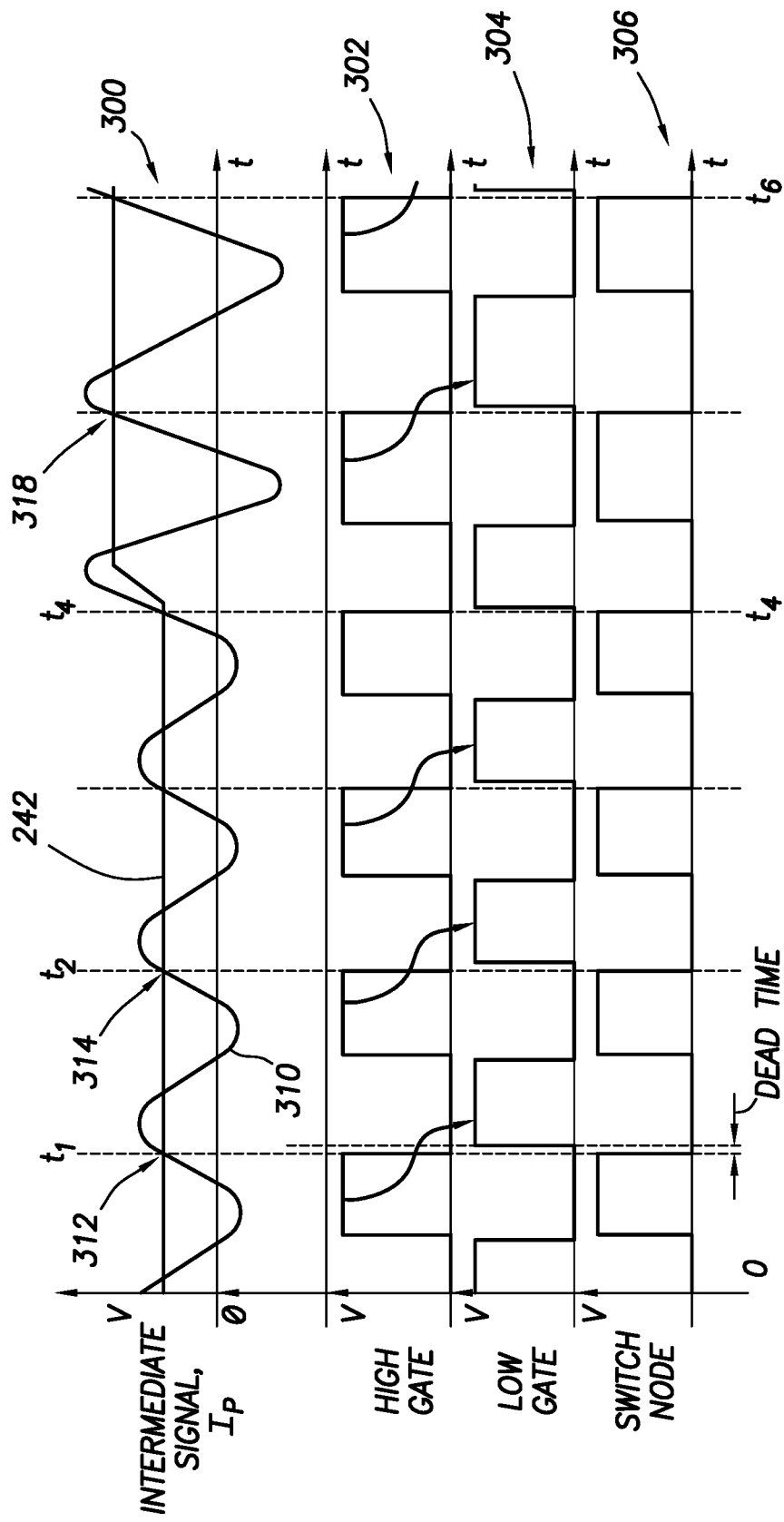
FIG. 3 shows a timing diagram in accordance with at least some embodiments.

FIG. 3 shows a timing diagram in accordance with at least some embodiments. In particular, FIG. 3 has four graphs or plots 300, 302, 304, and 306 shown with corresponding time axes. Plot 300 shows an example intermediate signal 242 co-plotted with a signal representative of primary current (hereafter just primary-current signal 310). The primary-current signal 310 (IP) may be the signal sensed by way of the current-sense terminal 162 (FIG. 1). Plot 302 shows an example gate signal applied to the high-side FET 108 (i.e., the signal driven by the FET driver 200 to the high-side gate terminal 122). Plot 304 shows an example gate signal applied to the low-side FET 110 (i.e., the signal driven by the FET driver 200 to the low-side gate terminal 130). The example gate signals of plots 302 and 304 as shown as asserted high, but the asserted state may be selected based on the type of FET implemented by each of the high-side FET 108 and low-side FET 110 (and the FETs need not be of the same type). Finally, plot 306 shows an example AC signal created at the switch node 116, as may be sensed by the frequency controller 206 (FIG. 2) by way of the switch-node terminal 160 (FIG. 1 or 2).

Referring simultaneously to FIGS. 1 and 3, for periods of time between zero and t4, the illustrative resonant power converter 100 is operating in a steady-state condition, as shown by the flat intermediate signal 242. In accordance with example embodiments, the high-side FET 108 is turned off in each cycle when the primary-current signal 310 crosses the intermediate signal 242. Consider specifically the period of time beginning with time t1 and extending to t2. When the primary-current signal 310 crosses the intermediate signal 242 (at crossing point 312), the primary-side controller 120 de-asserts the high-side gate terminal 122 and thus the gate 118 of the high-side FET 108. The high-side FET 108 thus becomes non-conductive and the input voltage $V_{DC}$ is disconnected from the switch node 116. A predetermined amount of time later (i.e., the dead time shown in the figure), the primary-side controller 120 asserts the low-side gate terminal 130 and the gate of the low-side FET 110. The low-side FET 110 thus becomes conductive, coupling the switch node 116 to ground. In example cases, the time length of the asserted states of the gate of the low-side FET 110 (and thus the conduction time of the low-side FET 110) is controlled by the primary-side controller 120 (specifically, the frequency controller 206 (FIG. 2)) to be the same time length as the immediately previous conduction time of the high side FET 108 (as shown by the curved arrows throughout FIG. 3). After the predetermined time length, the primary-side controller 120 de-asserts the low-side gate terminal 130 and thus the gate of the low-side FET 110. The low-side FET 110 thus becomes non-conductive, disconnecting the switch node 116 from ground. After another predetermined dead time (not specifically shown for the particular transition), the primary-side controller 120 again asserts high-side gate terminal 122 and thus the gate 118 of the high-side FET 108. Again, the high-side FET 108 becomes conductive, coupling the input voltage $V_{DC}$ to the switch node 116. And as before, as soon as primary-current signal 310 crosses the intermediate signal 242 (at crossing point 314), the primary-side controller 120 de-asserts the high-side-gate terminal 122 and thus the gate 118 of the high-side FET 108, and the process continues.

Making the high-side FET 108 conductive, and then the low-side FET 110 conductive, creates a voltage square wave signal at the switch node 116 as shown by plot 306 (and which creates the more sinusoidal primary current IP). The square wave signal at the switch node 116 can be considered an AC signal with a fundamental frequency set by switching frequency of the primary-side controller 120. No DC current flows in the primary winding 132 because of capacitor 140.

Still referring simultaneously to FIGS. 1 and 3. Again, the periods of time between zero and t4 represent steady state operation. At time t4, however, a change in the power drawn by the load takes place. In particular, at time t4 in this example the power drawn by the load increases. An increase in power drawn by the load may have several effects. First, increased power drawn by the load causes a slight drop in output voltage. The slight drop in output voltage is shown in FIG. 3 by an increase in magnitude of the intermediate signal 242 just after time t4. The increase in magnitude of the intermediate signal 242 when output voltage drops may be attributable to operation of the optocoupler 156. That is, when output voltage is lower fewer photons are created by the diode 152, and thus fewer photons are received at the base of transistor 154. As transistor 154 becomes less conductive, the voltage at the feedback input 236 (FIG. 2) goes higher because of pull-up resistor 316. Other configurations are possible as well. Nevertheless, once the intermediate signal 242 changes magnitude, the trigger point for turning off the high-side FET 108 correspondingly changes (e.g., crossing point 318). If no other changes are made by the frequency controller 206 (FIG. 2), the example increased magnitude of the intermediate signal 242 thus decreases the frequency of the AC signal created at the switch node 116 because the high-side FET 108 remains in a conductive state longer (compared to the prior time periods in FIG. 3).

Though not specially shown in FIG. 3, when the power drawn by the load decreases, output voltage increases slightly, the magnitude of the intermediate signal 242 decreases, crossing point changes, and thus the frequency of operation of the primary-side 102 of the resonant power converter 100 increases. The example system thus implements primary control of the resonant power converter 100 such that the frequency of operation is inversely proportional to power provided to the load. That is, as the power provided to the load increases, frequency decreases. And as power provided to the load decreases, frequency increases.

Returning to FIG. 2, simultaneously with the changes in frequency implemented by way of varying the magnitude of the intermediate signal 242 based on the feedback signal at the feedback input 236, the frequency controller 206 may also make changes in frequency. That is, in order to reduce harmonic distortion of the AC signal applied to the primary winding 132 (FIG. 1) of the transformer 106 (also FIG. 1), the example frequency controller 206 monitors the AC signal by way of the switch-node terminal 160 and sense input 216. In some cases, the frequency controller 206 is designed and constructed to operate such that the overall frequency is at or just below a resonant frequency of the LLC circuit on the primary side 102 (FIG. 1). In order to implement the frequency control, the frequency controller 206 changes and/or sends a ramp signal to the ramp compensation circuit 244 by way of the ramp output 246 coupled to the ramp input 238 of the feedback controller 230. As discussed in greater detail below, in some cases the ramp signal is an analog signal that controls a gain and/or bias applied to the feedback signal used to create the intermediate signal 242. However, in other cases the ramp signal may be a Boolean signal, or the frequency controller 206 may communicate with the ramp compensation circuit 244 by way of package-based messages. Nevertheless, the magnitude of the intermediate signal 242 is controlled based on both the feedback signal on the feedback terminal 158 (and feedback input 236), and also based on the ramp signal provided by the frequency controller (e.g., to reduce subharmonic oscillations).

FIG. 2 shows an example implementation of a fault detector 220. In particular, the example fault detector 220 senses an overcurrent condition in the primary winding 132 (FIG. 1) of the transformer 106 (also FIG. 1). In the embodiment shown, the sense input 222 is coupled to a non-inverting input 249 of a comparator 250. The inverting input 252 is coupled to a predetermined voltage (shown as voltage source 254). The voltage produced by voltage source 254 represents a current threshold in the primary winding 132. The voltage produced by the voltage source 254 is selected taking into account the various AC and DC voltage divider circuits implemented between the current-sense terminal 162 and the node 168 (FIG. 1). Thus, when current in the primary winding exceeds the predetermined threshold (i.e., an overcurrent condition), the comparator output 256 is asserted for the period of time the current is above the threshold (i.e., an overcurrent signal). The primary-current signal 310 (FIG. 3) is an AC signal, and in the example fault detector 220 the comparator 250 senses peak current in only half of the waveform of the primary-current signal 310 (i.e., the positive half cycle, but alternatively could be constructed to sense in the negative half cycle, or both). In overload or short circuit conditions, the primary-current signal 310 is likely to exceed the predetermined threshold in successive cycles, and so the signal created by the comparator 250 may be a plurality of pulses. Two control actions may be triggered by an overcurrent condition, the first is ceasing operation of the power converter if the overcurrent condition continues for predetermined number of cycles.

In particular, the example fault detector 220 of FIG. 2 implements a fault counter 258. The fault counter 258 has fault input 260 coupled to the comparator output 256. The fault counter 258 also defines the pulse-count input 224, the fault output 226, and the overcurrent output 228. With respect to ceasing operation in overcurrent conditions (e.g., heavily overloaded or short circuit on the secondary side 104 (FIG. 1)), the fault counter 258 is configured to sense or count pulses indicative of overcurrent conditions in each cycle of the frequency of the AC signal applied to the primary winding 132 (FIG. 1). If a predetermined number of overcurrent conditions are sensed in a predetermined number of cycles of the frequency of the AC signal (the cycles sensed by way of pulse-count input 224 coupled to the high-side gate terminal 122), the fault counter 258 (and thus the fault detector 220) asserts the fault output 226 to the frequency controller 206. The frequency controller 206, in turn, ceases operating the resonant power converter. The predetermined number of overcurrent conditions, and the predetermined number of cycles of the frequency of the AC signal, may be selectable by the designer of the resonant power converter. In some cases, the predetermined number of overcurrent conditions is between and including 5 and 10, and the predetermined number of cycles of the frequency of the AC signal more than 30 cycles. One example setup is that the fault counter 258 asserts the fault output 226 when six overcurrent conditions are detected in a rolling window of 50 cycles of the frequency of the AC signal.

The second control action that may be taken based on an overcurrent condition is to limit current in the primary side 102 (FIG. 1, and thus the secondary side 104) by increasing the frequency of the AC signal. In particular, the example fault counter 258 is further designed and constructed to assert the overcurrent output 228 upon detection of a predetermined number of overcurrent conditions. In one example embodiment, the overcurrent output 228 is asserted after a single overcurrent condition, but in other cases more than one overcurrent condition (but less than a number that results in ceasing operation) may be counted before assertion of the overcurrent output 228. Responsive action of the ramp compensation circuit 244 is discussed more below. Consider, however, that the responsive action of the ramp compensation circuit 244 lowers primary current such that peak primary current drops and the number of overcurrent conditions since the first overcurrent condition does not increment. In example embodiments, the fault counter 258 continues to assert the overcurrent output 228 for a predetermined number of cycles of the frequency of the AC signal (again, as sensed at the pulse-count input 224). In one example case, the fault counter may hold the overcurrent output 228 in an asserted state for 30 cycles of the frequency of the AC signal before de-asserting to give the overload or short circuit condition time to clear. If the overload or short circuit has not cleared by the time the overcurrent output is de-asserted, the frequency will again increasing and overcurrent conditions will appear, likely resulting in ceasing of operation. On the other hand, if the overload or short circuit condition clears during the period of time the overcurrent output 228 is asserted, when the overcurrent output 228 is de-asserted the resonant power converter resumes non-fault operation.

Figure 4:
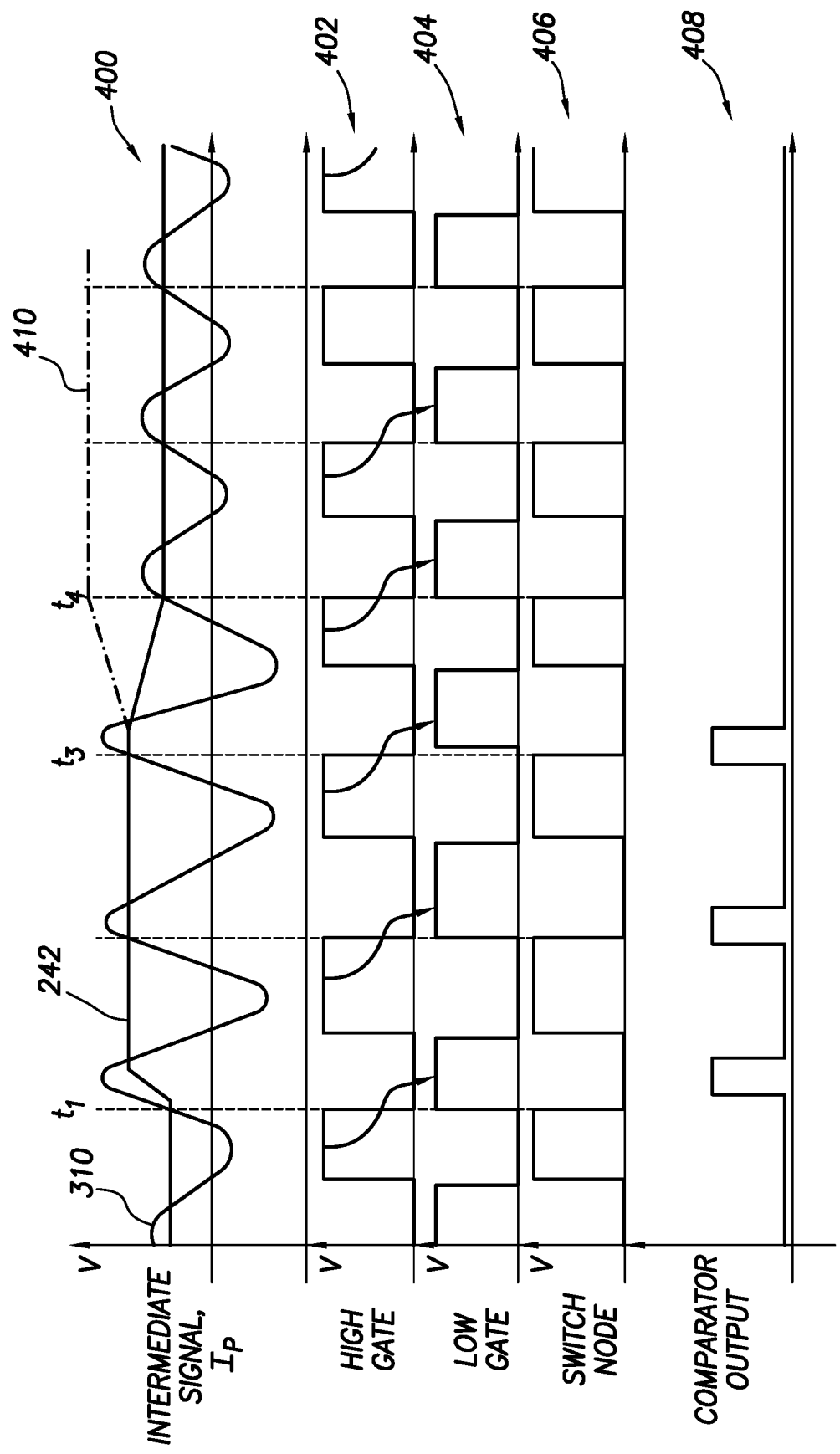
FIG. 4 shows a timing diagram in accordance with at least some embodiments.

FIG. 4 shows a timing diagram in accordance with at least some embodiments. In particular, FIG. 4 has five graphs or plots 400, 402, 404, 406 and 408 shown with corresponding time axes. Plot 400 shows an example intermediate signal 242 co-plotted with the example primary-current signal 310, and an example unmodified intermediate signal 410 (shown as a dash-dot-dash line). Similar to FIG. 3: plot 402 shows an example gate signal applied to the high-side FET 108; plot 404 shows an example gate signal applied to the low-side FET 110; and plot 406 shows an example AC signal created at the switch node 116. FIG. 4 also includes plot 408 which shows a signal driven by the comparator output 256 (FIG. 2).

Consider that in the time period around t1 (not the same time as t1 in FIG. 3), the power drawn by the load increases, such as caused by a heavy overload or short circuit condition (hereafter just "short circuit") coupled to the output voltage $V_{OUT}$ (FIG. 1). The short circuit increases current drawn at the output, and likewise decreases voltage. The decrease in output voltage results in an increase in the magnitude of the intermediate signal 242 as shown just after t1. As before, the increase in the magnitude of the intermediate signal 242 results in an initial decrease in frequency. However, also consider that the short circuit results in the current in the primary winding 132 (FIG. 1) exceeding the predetermined threshold (as set by voltage source 254 (FIG. 2)), and thus the comparator output 256 (FIG. 2) is asserted (i.e., overcurrent condition), and in the example situation resulting in three assertions as shown in plot 408.

In non-fault operation, decreasing output voltage results in an increasing magnitude of the intermediate signal 242, and an example increasing magnitude of the intermediate signal 242 is shown as unmodified intermediate signal 410 in plot 400. However, because of the overcurrent condition, in accordance with various embodiments the intermediate signal is modified to increase the frequency. For example, between t3 and t4 the magnitude of the intermediate signal 242 deceases, which results in increasing the frequency at time t4 and beyond as shown (and as compared to the frequency between times t1 and t3). Thus, the primary-side controller 120 (FIG. 1 or 3) limits input current and output current during short circuit conditions. Because the current is limited during short circuit conditions prior to shut down, various circuit components (e.g., transformer 106, bridge rectifier 144) can be designed for nominal power conditions rather than for overcurrent conditions that would be experienced but-for limiting the current. Moreover, after a certain number of cycles of the frequency of the AC signal (e.g., 30 cycles, 50 cycles), the intermediate signal 242 may be allowed to return to its unmodified state or condition. If the short circuit condition has cleared, the power converter returns to non-fault operational. If the short circuit is still present, based on increasing pulse count above a predetermined limit (within the predetermined number of cycles of the frequency of the AC signal) the fault counter 258 may assert the fault output 226, thus ceasing operation of the power converter.

Returning now to FIG. 2, modifying the intermediate signal 242 to increase the frequency responsive to the overcurrent condition may take many forms. For example, when the ramp compensation circuit 244 receives the asserted signal on its overcurrent input 234, the ramp compensation signal may clamp the intermediate signal 242 at a voltage that ensures, for the particular design of the resonant power converter 100 (FIG. 1), overcurrent conditions on the primary winding 132 will not occur. In other cases, the relationship between a feedback signal on the feedback input 236 and the intermediate signal 242 may be controlled by a look-up table. When the ramp compensation circuit 244 receives the asserted signal on its overcurrent input 234, the ramp compensation signal may change or switch to a different look-up table. In yet still other cases, the relationship between the feedback signal on the feedback input 236 and the intermediate signal 242 is based on a gain and/or bias applied to the feedback signal.

Figure 5:
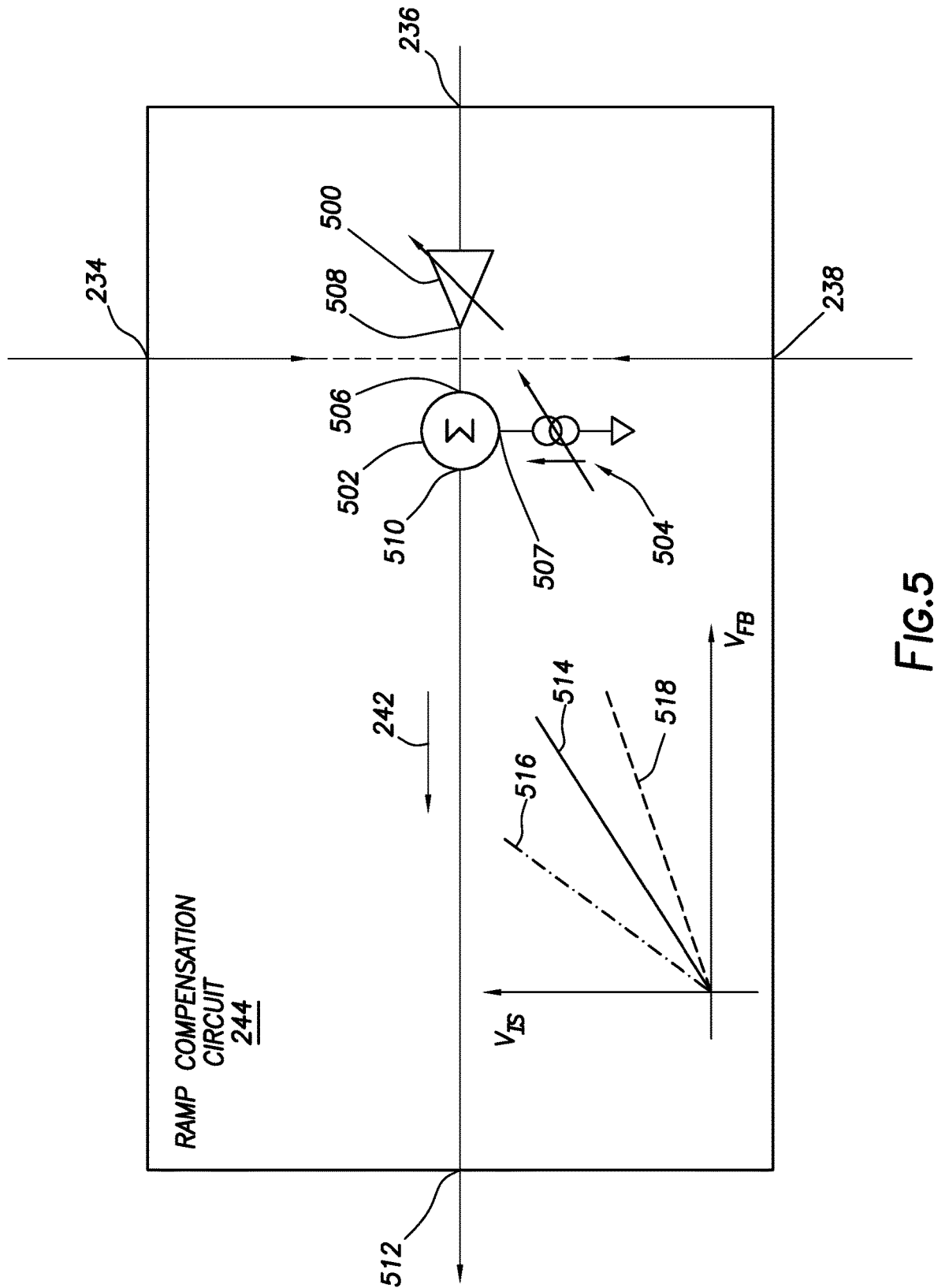
FIG. 5 shows a block diagram of a ramp compensation circuit in accordance with at least some embodiments.

FIG. 5 shows a block diagram of a ramp compensation circuit in accordance with at least some embodiments. In particular, the example ramp compensation circuit 244 includes an adjustable-gain amplifier 500 having an amplifier input 502 coupled to the feedback input 236. Moreover, the example ramp compensation circuit 244 includes bias circuit shown as a summation block 502 and a controlled-current source 504. The summation block 502 has a summation input 506 coupled to an amplifier output 508, and the summation block 502 has a sum output 510 coupled to intermediate output 512 of the ramp compensation circuit 244. Moreover, the summation block 502 has another summation input 507 coupled to the controlled-current source 504. Thus, in the example embodiments the voltage created by the amplifier 500 is summed with a voltage created by the controlled-current source 504 to create the intermediate signal 242. It will be understood, however, that the bias circuit in the form of the summation block 502 and controlled-current source 504 may be omitted in favor of just the adjustable-gain amplifier 500, and oppositely the adjustable-gain amplifier 500 may be omitted in favor of just the bias circuit, all without departing from the scope and spirit of the disclosure.

In accordance with example embodiments, the gain provided by the adjustable-gain amplifier 500 is controlled by both frequency controller 206 (FIG. 2) by way of the ramp input 238, and the gain is also controlled by the fault counter 258 (FIG. 2) by way of the overcurrent input 234. In non-fault operation, the frequency controller 206 may adjust the gain to control the frequency to achieve a desired operating frequency (e.g., frequency that reduces harmonic distortion, or ensures operation in continuous conduction mode). The bias provided by the controlled-current source 504 and summation block 502 (if present) is controlled by both frequency controller 206 (FIG. 2) by way of the ramp input 238, and controlled by the fault counter 258 (FIG. 2) by way of the overcurrent input 234. In non-fault operation, the frequency controller 206 may adjust the bias to control the frequency to achieve a desired operating frequency (e.g., frequency that reduces harmonic distortion, or ensures operation in continuous conduction mode).

Stated slightly differently, the feedback controller 230 (by way of the example ramp compensation circuit 244) is designed and constructed such that during periods of time when the overcurrent signal on the overcurrent input 234 is de-asserted, the feedback controller 230 may apply a gain to the signal representative of output voltage. In addition to, or in place of the gain, the feedback controller 230 (by way of the example ramp compensation circuit 244) is designed and constructed such that during periods of time when the overcurrent signal on the overcurrent input 234 is de-asserted, the feedback controller 230 may apply a bias to the signal representative of output voltage. The application of the gain alone, the bias alone, or the combination of gain and bias creates the intermediate signal 242.

However, during periods of time when the overcurrent signal on the overcurrent input 234 is asserted, the feedback controller 230 (by way of the example ramp compensation circuit 244) is designed and constructed to change the gain used to create the intermediate signal from an original gain to a modified gain different than the original gain. In addition to, or in place of the gain, the feedback controller 230 (by way of the example ramp compensation circuit 244) is designed and constructed such that during periods of time when the overcurrent signal on the overcurrent input 234 is asserted, the feedback controller 230 may apply a bias to the signal representative of output voltage. Nevertheless, during the periods of time when the overcurrent signal is asserted, the application of the gain alone, the bias alone, or the combination of gain and bias still creates the intermediate signal 242.

FIG. 5 has embedded within the ramp compensation circuit 244 a graph showing example relationships between the voltage on the feedback input ($V_{FB}$) 236 and the voltage of the intermediate signal ($V_{IS}$) 242 created by the ramp compensation circuit 244. In particular, solid line 514 represents a gain that has a slope of one (i.e., unity gain). Gain increases (e.g., gain increase above the gain that results in a slope of one) increase slope, such as shown by dash-dot-dash line 516. Gain decreases (e.g., gain decrease below the gain that results in a slope of one) decrease slope, such as shown by dashed line 518. The gain used for any particular non-fault operating condition can be arbitrarily chosen to be above unity gain, unity gain, or below unity gain. Nevertheless, when the overcurrent signal is asserted, the gain change responsive to the assertion of the overcurrent signal decreases slope. Oppositely, when the overcurrent signal the transitions from an asserted state to a de-asserted state, the gain change responsive to the de-assertion increases slope. Though not specifically shown in the embedded relationship in FIG. 5, similarly when the overcurrent signal is asserted, the bias (if used) change responsive to the assertion of the overcurrent signal decreases bias. Oppositely, when the overcurrent signal the transitions from an asserted state to a de-asserted state, the bias change responsive to the de-assertion increases bias.

Figure 6:
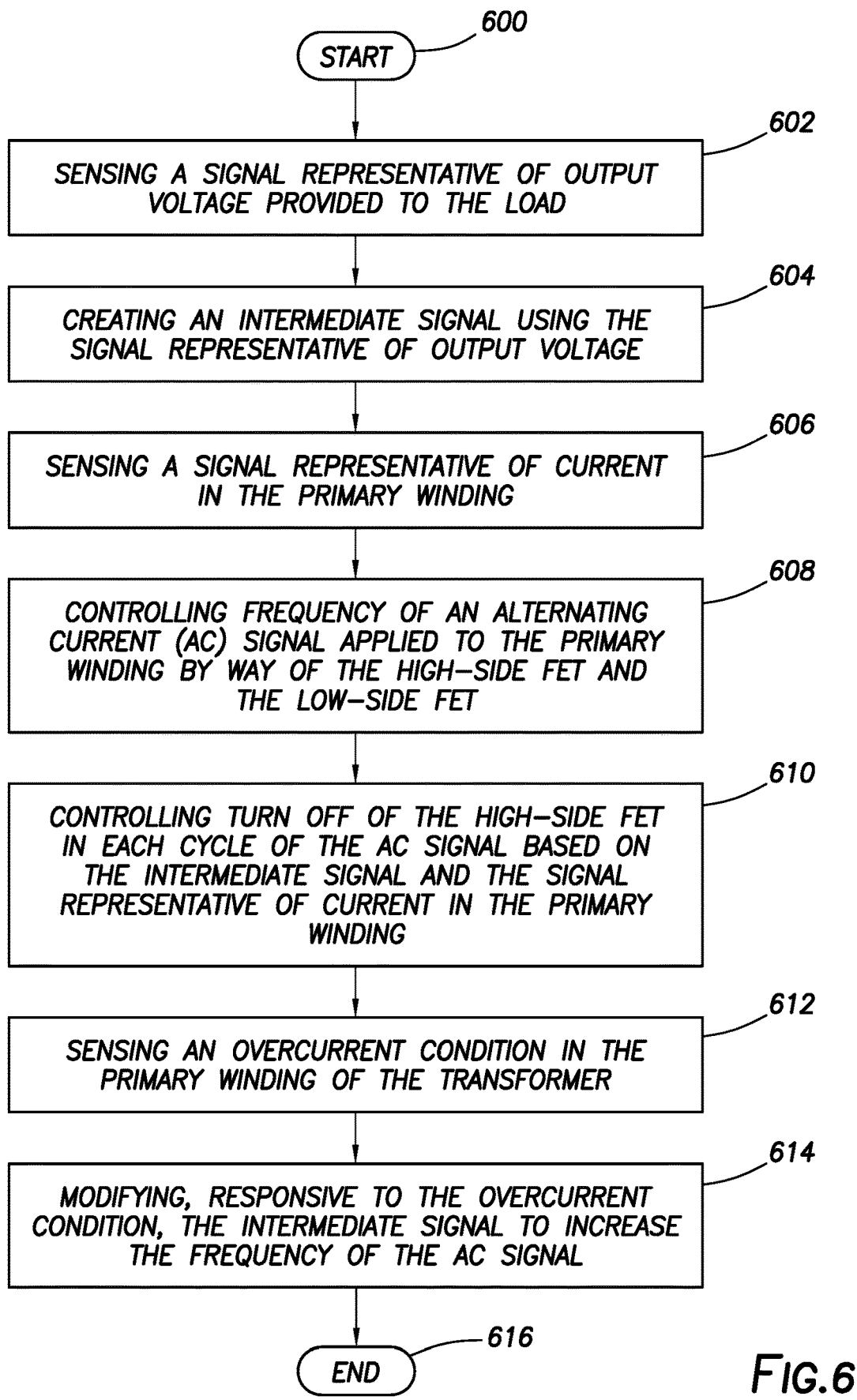
FIG. 6 shows a method in accordance with at least some embodiments.

FIG. 6 shows a method in accordance with at least some embodiments. That is, in a power converter having high-side FET that selectively couples an input voltage to a primary winding of the transformer, a low-side FET that selectively couples the primary of the transformer to ground, and a secondary winding of the transformer that provides power to a load on a secondary side, the method starts (block 600) and comprises: sensing a signal representative of output voltage provided to the load (block 602); creating an intermediate signal using the signal representative of output voltage (block 604); sensing a signal representative of current in the primary winding (block 606); controlling frequency of an alternating current (AC) signal applied to the primary winding by way of the high-side FET and the low-side FET (block 608); controlling turn off of the high-side FET in each cycle of the AC signal based on the intermediate signal and the signal representative of current in the primary winding (block 610); sensing an overcurrent condition in the primary winding of the transformer (block 612); and modifying, responsive to the overcurrent condition, the intermediate signal to increase the frequency of the AC signal (block 614). Thereafter, the method may end (block 616).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a power converter comprising:
   sensing a signal representative of an output voltage provided to a load;
   creating an intermediate signal using the signal representative of the output voltage;
   sensing a signal representative of a current in a primary winding of a transformer;
   controlling frequency of an alternating current (AC) signal applied to the primary winding by way of a high-side field effect transistor (FET) and a low-side FET, the high-side FET selectively couples an input voltage to the primary winding, and the low-side FET selectively couples the primary winding to ground;
   asserting a fault input to a fault counter each time the signal representative of the current in the primary winding exceeds a predetermined threshold;
   asserting, by the fault counter, an overcurrent output responsive to a first predetermined number of assertions of the fault input within a second predetermined number of cycles of the frequency of the AC signal;
   during periods of time when the overcurrent output is de-asserted, controlling turn off of the high-side FET in each cycle of the AC signal based on the intermediate signal and the signal representative of the current in the primary winding; and
   during periods of time when the overcurrent output is asserted, increasing the frequency of the AC signal by modifying the intermediate signal to create a modified signal, and by controlling turn off of the high-side FET in each cycle based on the modified signal and the signal representative of the current in the primary winding.

2. The method of claim 1:
   wherein creating the intermediate signal further comprises applying a gain to the signal representative of the output voltage; and
   wherein modifying further comprises changing the gain used to create the intermediate signal, the modification from an original gain to a modified gain different than the original gain.

3. The method of claim 2 further comprising, after the changing the gain, returning to the original gain a predetermined amount of time after the changing.

4. The method of claim 3 wherein the predetermined amount of time is at least one selected from a group comprising: a predetermined number of cycles of the AC signal applied to the primary winding; and a predefined duration of a timer.

5. The method of claim 1:
   wherein creating the intermediate signal further comprises applying a bias to the signal representative of the output voltage; and
   wherein modifying further comprises changing the bias used to create the intermediate signal.

6. The method of claim 5 wherein changing the bias further comprises reducing the bias.

7. The method of claim 1:
   wherein creating the intermediate signal further comprises applying a gain and a bias to the signal representative of the output voltage; and
   wherein modifying the intermediate signal further comprises changing at least one selected from a group consisting of: the gain; and the bias.

8. The method of claim 1:
   wherein controlling frequency further comprises controlling based on sensing the signal representative of the current in the primary winding through a current-sense terminal of a primary-side controller.

9. The method of claim 1 further comprising:
   de-asserting the overcurrent output after a third predetermined number of cycles the frequency of the AC signal in which the fault input is not asserted; and then
   returning to an original intermediate signal.

10. The method of claim 1 further comprising:
    asserting, by the fault counter, a fault output responsive to third predetermined number of assertions of the fault input within a fourth predetermined number of cycles of the frequency of the AC signal; and
    ceasing operation of the power converter responsive to assertion of the fault output.

11. The method of claim 10 wherein asserting the fault output further comprises asserting the fault output responsive to between and including 5 and 10 assertions of the fault input in a contiguous set of more than 30 cycles of the frequency of the AC signal.

12. The method of claim 1 wherein sensing a signal representative of output voltage further comprises:
    applying the output voltage to a diode of an optocoupler;
    creating the signal representative of the output voltage by a transistor of the optocoupler.

13. An integrated circuit comprising:
    a driver circuit within the integrated circuit;
    a frequency controller within the integrated circuit and coupled to the driver circuit, the frequency controller configured to control frequency of signals driven to a high-side gate terminal and a low-side gate terminal;
    a first comparator within the integrated circuit, the first comparator defining a first input coupled to a current sense terminal, a second input coupled to a reference voltage, and a comparator output, the first comparator configured to assert the comparator output each time a signal on the current sense terminal transitions through the reference voltage;
    a fault counter within the integrated circuit, the fault counter defining a fault input coupled to the comparator output, and an overcurrent output, the fault counter configured to assert the overcurrent output responsive to a first predetermined number of assertions of the fault input within a second predetermined number of cycles of the frequency of the signals driven to the high-side gate terminal and low side gate terminal;
    a feedback controller within the integrated circuit, the feedback controller comprising:
       a ramp compensation circuit defining an intermediate output, an overcurrent input coupled to the overcurrent output, and a feedback input coupled to a feedback terminal;
       a second comparator defining a first input coupled to the current sense terminal, a second input coupled to the intermediate output, and a comparator output coupled to the frequency controller;

during periods of time when the overcurrent input is de-asserted, the ramp compensation circuit configured to sense a signal representative of an output voltage by way of the feedback terminal and to create an intermediate signal applied to the intermediate output; and during periods when the overcurrent input is asserted, the ramp compensation circuit configured to modify the intermediate signal to increase the frequency of the signals driven to the high-side gate terminal and the low-side gate terminal.

14. The integrated circuit of claim 13 further comprising:
the ramp compensation circuit, during periods of time when the overcurrent input is de-asserted, is configured to apply a gain to the signal representative of the output voltage to create the intermediate signal; and
the ramp compensation circuit, during periods of time when the overcurrent input is asserted, is further configured to change the gain used to create the intermediate signal from an original gain to a modified gain different than the original gain.

15. The integrated circuit of claim 14 wherein the ramp compensation circuit is further configured return to the original gain responsive to de-assertion the overcurrent input.

16. The integrated circuit of claim 13 further comprising:
the ramp compensation circuit, during periods of time when the overcurrent input is de-asserted, is configured to apply a bias to the signal representative of the output voltage to create the intermediate signal; and
the ramp compensation circuit, during periods of time when the overcurrent input is asserted, is configured to change the bias from an original bias to a modified bias different than the original bias.

17. The integrated circuit of claim 13 further comprising:
the ramp compensation circuit, during periods of time when the overcurrent input is de-asserted, is configured to apply a gain and bias to the signal representative of the output voltage to create the intermediate signal; and
the ramp compensation circuit, during periods of time when the overcurrent input is asserted, is configured to change at least one selected from a group consisting of: the gain; and the bias.

18. A resonant power converter comprising:
a transformer comprising a primary winding and a secondary winding, the secondary winding of the transformer configured to provide power to a load on a secondary side;
a high-side field effect transistor (FET) that selectively couples an input voltage to the primary winding of the transformer;
a low-side FET that selectively couples the primary of the transformer to ground;
a FET controller defining a high-side gate terminal coupled to a gate of the high-side FET, a low-side gate terminal coupled to a gate of the low-side FET, a current-sense terminal coupled a voltage divider, and a feedback terminal coupled to sense voltage on a secondary side of the resonant power converter, the FET controller comprising:
a frequency controller coupled to a driver circuit, the frequency controller configured to control frequency of signals driven to the high-side gate terminal and the low-side gate terminal;
a comparator defining a first input coupled to the current-sense terminal, a second input coupled to a reference voltage, and a comparator output, the comparator configured to assert the comparator output each time a signal on the current-sense terminal transitions through the reference voltage;
a fault counter defining a fault input coupled to the comparator output, and an overcurrent output, the fault counter configured to assert the overcurrent output responsive to a first predetermined number of assertions of the fault input within a second predetermined number of cycles of the frequency of signals driven to the high-side gate terminal and low side gate terminal;
a ramp compensation circuit defining an intermediate output, an overcurrent input coupled to the overcurrent output, and a feedback input coupled to the feedback terminal;
a second comparator defining a first input coupled to the current-sense terminal, a second input coupled to the intermediate output, and a comparator output coupled to the frequency controller;
during periods of time when the overcurrent input is de-asserted, the ramp compensation circuit is configured to sense a signal representative of an output voltage by way of the feedback terminal and to create an intermediate signal; and
during periods when the overcurrent input is asserted, the ramp compensation circuit is configured to modify the intermediate signal to increase the frequency of the signals driven to the high-side gate terminal and the low-side gate terminal.

19. The method of claim 1 wherein asserting the overcurrent output further comprises asserting the overcurrent output responsive to a single assertion of the fault input.

* * * * *